(12) United States Patent
Krugh, IV et al.

(10) Patent No.: US 6,337,623 B1
(45) Date of Patent: Jan. 8, 2002

(54) ELEVATED WARNING SYSTEM FOR VEHICLES

(75) Inventors: J. Adam Krugh, IV, 3912 W. 73 Ter., Prairie Village, KS (US) 66208-2931; Mark J. Catanzaro, Overland Park; James D. Parks, Olathe, both of KS (US)

(73) Assignee: J. Adam Krugh, IV, Prairie Village, KS (US)

( * ) Notice: Subject to any disclaimer, the term of this patent is extended or adjusted under 35 U.S.C. 154(b) by 0 days.

(21) Appl. No.: 09/373,961

(22) Filed: Aug. 13, 1999

Related U.S. Application Data

(63) Continuation-in-part of application No. 09/018,434, filed on Feb. 4, 1998.

(51) Int. Cl.[7] ................................................ B60Q 1/52
(52) U.S. Cl. ...................... 340/472; 340/433; 340/480; 340/487; 40/592; 362/493
(58) Field of Search .................................. 340/472, 433, 340/425, 432, 487, 480, 471; 362/493; 40/592

(56) References Cited

U.S. PATENT DOCUMENTS

| | | | | |
|---|---|---|---|---|
| 3,761,890 A | * | 9/1973 | Fritts et al. ................. | 340/493 |
| 3,783,267 A | * | 1/1974 | Thomas ....................... | 362/523 |
| 4,052,697 A | * | 10/1977 | Daifotes ..................... | 340/472 |
| 4,070,775 A | * | 1/1978 | Brooks ........................ | 40/492 |
| 5,036,307 A | * | 7/1991 | Reavell et al. .............. | 340/487 |
| 5,038,136 A | * | 8/1991 | Watson ........................ | 340/480 |
| 5,281,948 A | * | 1/1994 | Estrada ....................... | 340/433 |
| 5,931,573 A | * | 8/1999 | Knox .......................... | 340/493 |

OTHER PUBLICATIONS

Weaver® Division Dura Corporation Form No. 1505 771, Sep. 1971.*#jf139##

*Primary Examiner*—Edward Lefkowitz
*Assistant Examiner*—Davetta W. Goins
(74) *Attorney, Agent, or Firm*—Hovey, Williams, Timmons & Collins

(57) ABSTRACT

A supplemental warning apparatus for school buses which is mounted on the roof of the bus in a vertical plane spaced above the usual warning sign which is carried on the side of the bus, the warning apparatus including a display member carried by a base which display member is shiftable between a retracted position and an upright vertically extended warning position. The supplemental warning apparatus may be coupled with the warning sign assembly on the side of the school bus; the passenger door of the school bus; or may be directly operated by the driver of the bus, all to the end that a warning is given from the roof of the bus which can be seen by surrounding traffic when the view of the normal warning sign on the side of the bus is blocked by such traffic.

17 Claims, 3 Drawing Sheets

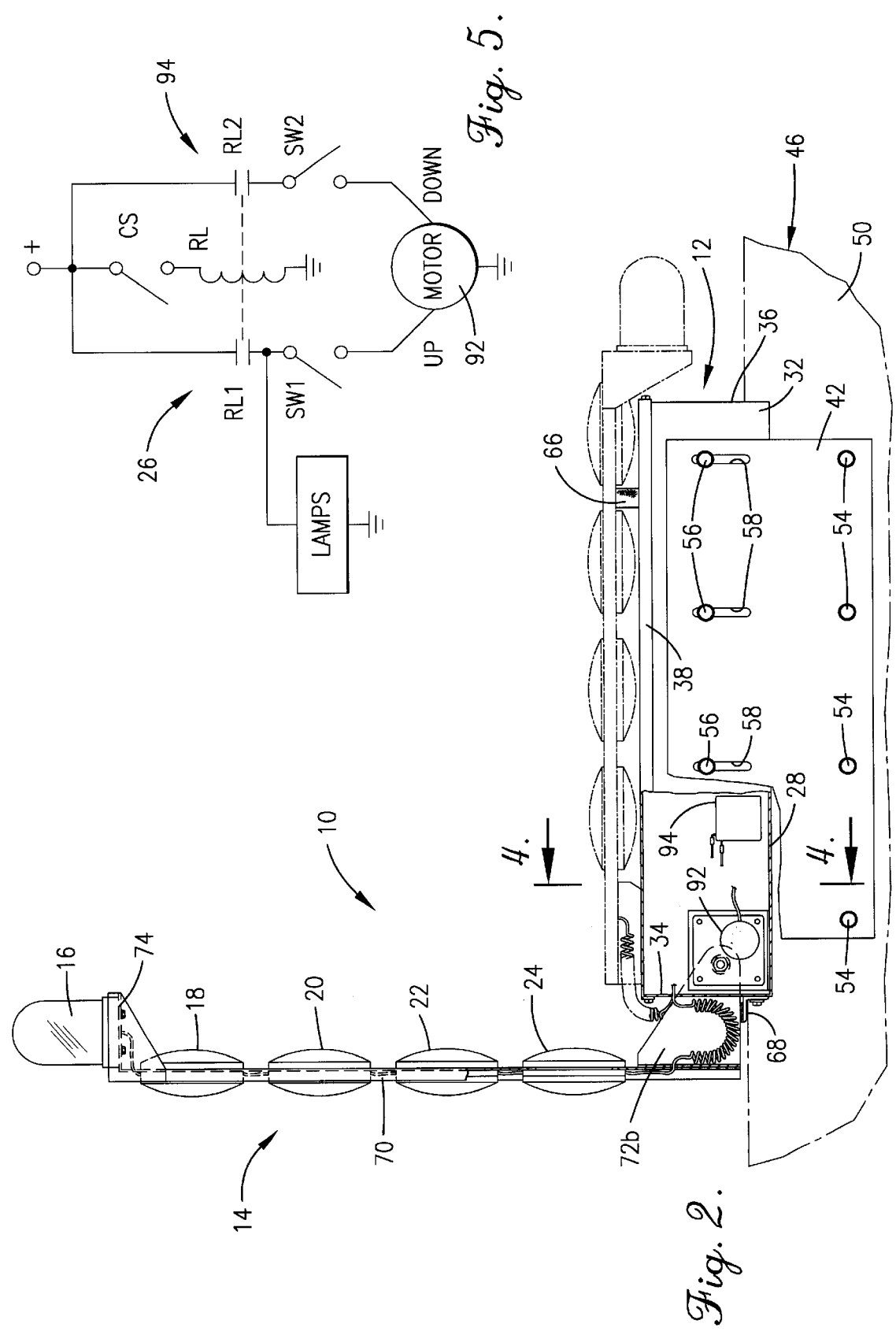

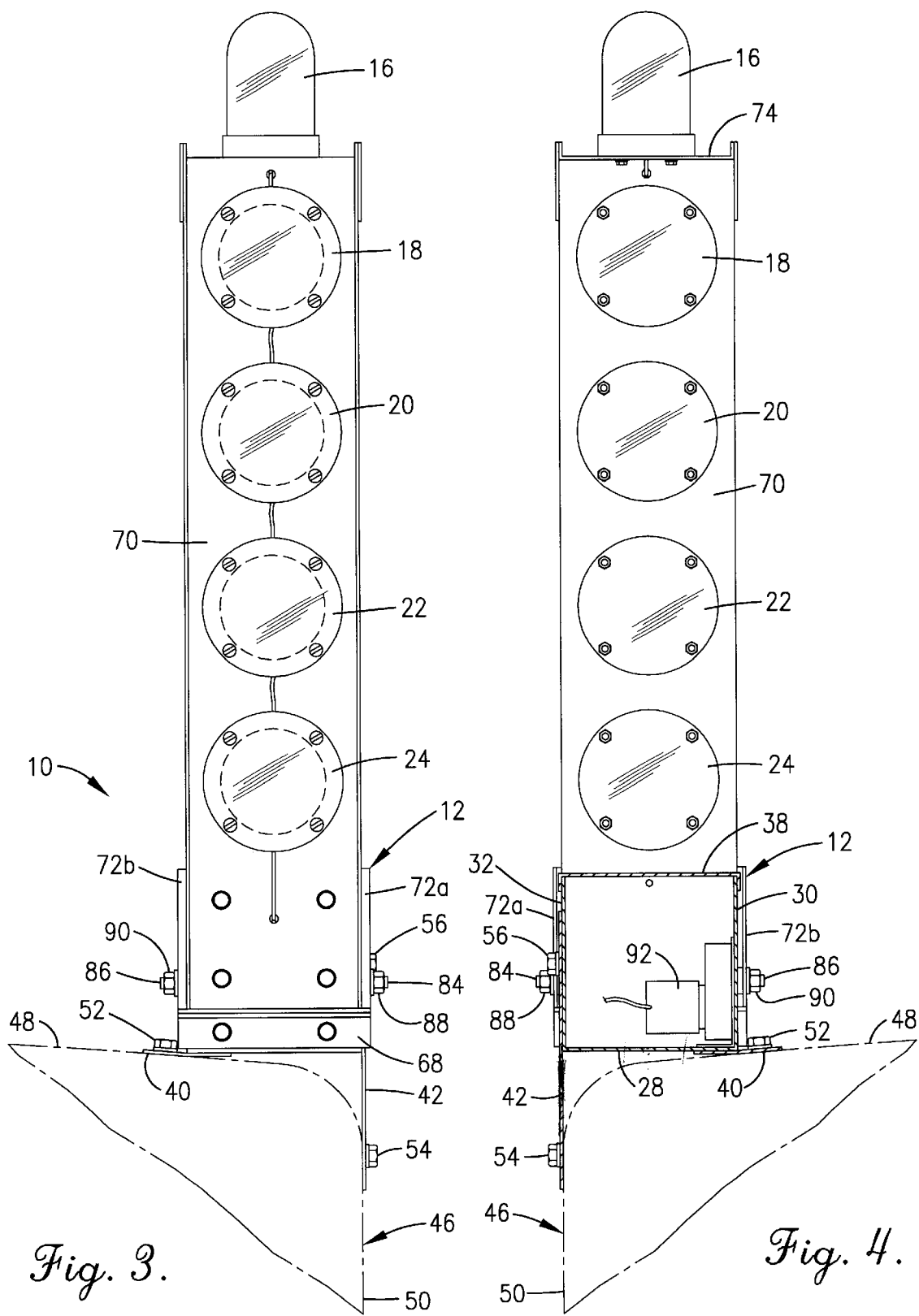

ELEVATED WARNING SYSTEM FOR VEHICLES

RELATED APPLICATIONS

This is a continuation-in-part of Application Ser. No. 09/018,434 filed Feb. 4, 1998, and entitled "Elevated Warning System for Vehicles".

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention deals with warning systems for vehicles and more particularly for school buses. Particularly, a supplemental warning apparatus is provided for a school bus, which bus usually carries a warning sign assembly on the side of the bus adjacent the front of the bus and which warning sign assembly is operable to shift a warning sign, normally a stop sign, between a non-extended position adjacent the side of the bus and warning position extending outwardly from the side of the bus. The supplemental warning system is positioned on the roof of the school bus essentially above the usual warning sign assembly and consists of a base mounted on the roof of the bus in a plane vertically spaced from that of the usual warning sign assembly, a display member coupled with the bus and shiftable between a retracted non-warning position and a vertical warning position, the display member having lamps and lights thereon which are activated when the display member is placed in its vertical position to warn adjacent drivers that the bus is stopped and children will be disembarking. It has been found that, due to the height of present passenger vehicles such as sport utility vehicles, the normal warning sign that extends from the side of a school bus is not visible to the drivers of adjacent vehicles, since the sign, in its location adjacent the side of the bus, normally at about eye level, is blocked from view by preceding vehicles such as vans, SUV's and the like. The present invention provides a warning apparatus which is on the roof of the bus and which, due to it having a vertically extending illuminated member, is readily visible to all surrounding vehicles since the display member, when it is in its extended warning position, is high above the top of any adjacent passenger vehicle.

The supplemental warning apparatus can be activated by means coupled with the warning sign assembly on the side of the school bus whereby when this warning sign is extended the supplemental warning apparatus is automatically activated. On the other hand, the supplemental warning apparatus may be activated by being coupled with the passenger door of the school bus whereby when the same is opened, the supplemental warning apparatus is activated and, when the doors are closed, the supplemental warning apparatus is lowered to its non-warning position. Finally, the supplemental warning apparatus may be independently controlled by the driver of the school bus whereby he may selectively actuate the same depending upon surrounding conditions and when he believes that the normal warning sign assembly will accomplish the desired results of warning adjacent vehicles that the bus is stopped and is loading or unloading.

2. Description of the Prior Art

The prior art teaches warning signals which may be carried by vehicles and which have means shiftable from a retracted to a warning position. The prior art does not teach a combination of a normal warning sign assembly, such as that usually carried by a school bus, and a supplemental warning apparatus which is positioned on the roof of the school bus essentially above the normal warning sign and which may be coupled with the warning sign whereby to be simultaneously activated; or may be coupled with the door of the bus whereby to be activated by the operation thereof; or which is independently operable by the driver of the bus for selective actuation. The prior art does not teach an elevated warning system for vehicles such as school buses wherein the usual warning sign assembly which extends a stop sign from the side of the bus is supplemented by a warning apparatus which is positioned on the top of the bus and which presents an illuminated sign which is highly visible, notwithstanding the condition of traffic surrounding the bus.

SUMMARY OF THE INVENTION

The present invention solves the prior art problems mentioned above and provides a supplemental warning apparatus for school buses wherein the supplemental apparatus is placed on the roof of the bus essentially above the usual warning sign in a vertically plane spaced therefrom whereby the usual warning sign is enhanced by the provision of the supplemental warning apparatus to advise adjacent drivers, who could not normally see the usual warning sign assembly due to the height of adjacent vehicles, that the school bus has stopped and will be loading or unloading.

The supplemental warning apparatus may be activated either independently by the driver, depending upon his analysis of adjacent traffic conditions; may be coupled with the usual warning sign whereby when the same is extended the supplemental warning apparatus is raised from the roof of the bus; or may be activated by being coupled with the doors of the school bus whereby when the same are opened the supplemental warning apparatus is automatically raised from the roof of the bus.

The preferred embodiment of the supplemental warning apparatus includes a base which is mounted on the roof of the school bus in a plane vertically spaced from that of the warning sign assembly which is on the side of the bus, the base carrying a shiftable display member which is movable between a retracted non-warning system and an upwardly extended warning position. The display member includes a plurality of warning indicators such as flashing lights, a strobe light, or other suitable attention getting indicia.

BRIEF DESCRIPTION OF THE DRAWINGS

FIG. 2 is a side elevational view of the apparatus of FIG. 1;

FIG. 3 is a front elevational view of the apparatus of FIG. 1;

FIG. 4 is a rear elevational view in partial section of the apparatus of FIG. 1; and FIG. 5 is an electrical schematic of the control circuit of the apparatus of Page 1.

DETAILED DESCRIPTION OF THE PREFERRED EMBODIMENT

Figure 1:
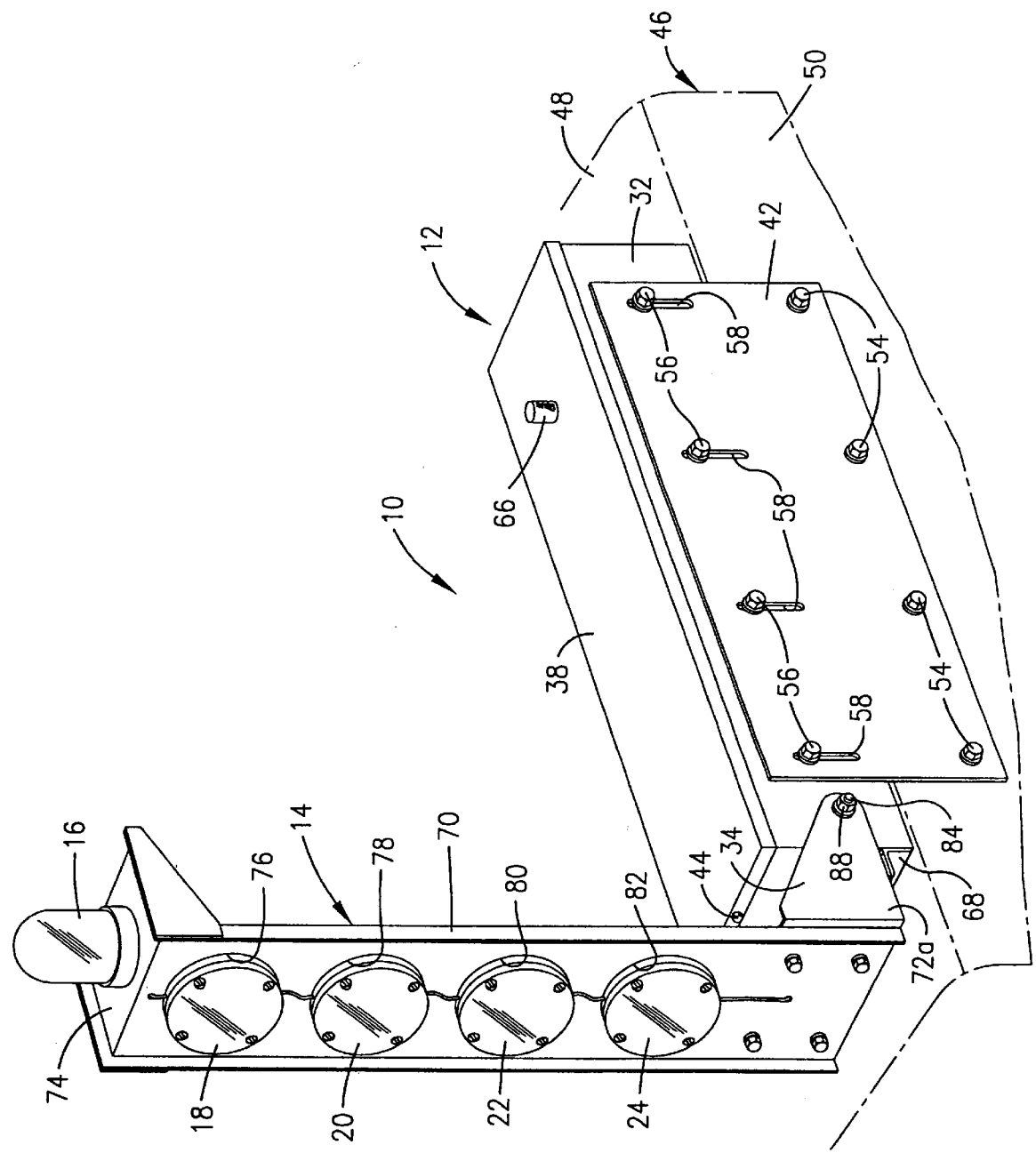
FIG. 1 is a front, left pictorial view of the preferred warning apparatus in accordance with the present invention showing the display member in the extended position and showing the apparatus mounted to a school bus shown in phantom lines.

The drawing figures illustrate warning apparatus 10 in accordance with the present invention. Apparatus 10 broadly includes base 12, display member 14, a plurality of warning indicators in the nature of a strobe light 16 and incandescent lamps 18, 20, 22 and 24, and operating assembly 26.

Base 12 is preferably composed of sheet metal and includes bottom wall 28, inboard side wall 30, outboard side wall 32, end wall 34, end wall 36, cover 38, mounting strap 40 and mounting flange 42. As best viewed in FIG. 4, bottom wall 28 and side walls 30, 32 are integrally formed to present a U-shaped configuration in cross section. Flanged cover 38 is removable and is attached using sheet metal screws such as screw 44 through the flange to end walls 34, 36 as best viewed in FIG. 1.

FIGS. 1–4 illustrate base 12 mounted on a school bus 46 (shown in phantom lines) along the left edge of roof 48 adjacent side 50 of the bus. In particular, mounting strap 40 extends along the length of base 12 from the inboard corner and serves as a flange for coupling base 12 with roof 48 using fasteners therealong such as fastener 52.

Mounting flange 42 intercouples outboard side wall 32 of base 12 with side 50 of bus 46. Fasteners 54 connect flange 42 with side 50 and fasteners 56 couple flange 42 with outboard side wall 32 through adjustment slots 58. As best viewed in FIGS. 3 and 4, slots 58 allow base 12 to be leveled with respect to vehicle 46. Base 12 also includes retraction stop 66 in the nature of a knob mounted to cover 38 and extension stop 68 in the nature of a length of angle iron attached to end wall 34 as best viewed in FIG. 1.

Display member 14 includes arm 70 in the form of a channel, hinge brackets 72a and 72b attached to one end arm 70, and gusset-reinforced platform 74 attached to the other end of arm 70 and supporting strobe light 16 thereon. Arm 70 also includes four, lamp openings 76, 78, 80 and 82 defined therein respectively receiving and supporting lamps 18–24. As best viewed in FIG. 2, the length of arm 70 is sufficient so that platform 74 extends beyond end wall 36 when display member 14 is in the retracted position.

Brackets 72a, b are positioned adjacent the outboard sides of side walls 30, 32 and are pivotally coupled therewith by pivot shafts 84 and 86 secured by nuts 88 and 90. As explained below, pivot shaft 86 is the output shaft of the operating motor.

Operating assembly 26 includes conventional 12 V.D.C. gear motor 92 coupled within base 12 and presenting shaft 86 through inboard side wall 30 and coupled with hinge bracket 72b. Motor 92 includes internal, adjustable, cam-operated limit switches SW1 and SW2 represented in FIG. 5.

Assembly 26 also includes relay 94 positioned within base 12 adjacent motor 92 and control switch CS. Relay 94 includes relay coil RL, normally open relay contact RL1 and normally closed relay contact RL2. Assembly 26 is powered by connecting to the electrical system of the bus to which it is attached, although apparatus 10 could include its own battery power supply if desired for specific applications.

In operation, display member 14 is normally in the retracted position illustrated by the phantom lines in FIG. 2. In this position, arm 70 rests on retraction stop 66. Control switch CS initiates shifting of display member 14 to the extended position illustrated in FIGS. 1–4.

In the preferred embodiment, apparatus 10 is mounted to a school bus and control switch CS is a limit switch coupled with the vehicle's electrical system and attached to the door of the bus so that switch CS closes when the door is open. Control switch could also be attached to the mechanical operator of the warning sign that extends from the side of the bus so that switch CS closes whenever this sign is extended. As another alternative, switch CS could be a manually operated on-off switch controlled by the driver.

Closure of switch CS energizes relay 94 and in particularly, relay coil RL. In turn, coil RL closes contact RL1 and opens contact RL2.

With display member 14 in the retracted position, motor limit switch SW2 is open and limit switch SW1 is closed. Thus, closure of relay contact RL1 energizes motor 92 to rotate in the up direction in order to shift display member 14 to the extended position. Specifically, motor shaft 86 rotates which in turn rotates brackets 72a, b to shift member 14 to the extended position. Closure of relay contact RL1 also energizes strobe light 16 and lamps 18–24 electrically wired in parallel and connected as shown in FIG. 5. It will be understood that lamps 18–24 could be the type with an internal flasher or an external flasher could be added for one or more of the lamps in the circuit of FIG. 5.

When display member 14 reaches the extended position, the cams within motor 92 are configured to open limit switch SW1 thereby stopping motor 92. At the same time, the cams close limit switch SW2. however, relay contact RL2 is open thereby preventing operation of motor 92. In this way, display member 14 remains in the extended position.

When the door of the bus closes, switch CS opens thereby de-energizing coil RL, opening relay contact RL1 to de-energize the lamps, and closing relay contact RL2. Limit switch SW2 is already closed and motor 92 is energized so that pivot shaft rotates in the down direction to shift display member 14 to the retracted position. When this occurs, limit switch SW2 opens to stop motor 92 and limit switch SW1 closes to be ready for the next operation.

As will be appreciated, the configuration of apparatus 10 presents light 16 and lamps 18–24 as a vertically oriented light bar extending above the roof line of the vehicle. This creates high visibility indicating in unmistakable fashion the presence of a stopped school bus.

The supplemental warning apparatus is preferably placed on the roof of the bus in a plane vertically spaced from that of the conventional warning sign assembly which is carried on the side of the bus. Said conventional warning sign assembly includes a warning sign, normally a stop sign, which is operable to shift the warning sign between a non-extended position adjacent the side of the bus to an extended, warning position in which the warning sign extends outwardly from the side of the bus.

The supplemental warning apparatus is, as described above, mounted on the roof of the bus so that the apparatus is high above the tops of ordinary passenger vehicles which might be adjacent the bus. This for the reason that, due to the recent advent of taller passenger vehicles such as sport utility vehicles, vans and the like, it has been found that the usual warning sign, when extended from the side of the bus in crowded traffic conditions, is not visible by adjacent drivers in that it is hidden from view.

Accordingly, the supplemental warning apparatus on the roof of the bus, with its lamps and lights, is visible from a distance because it is high above the tops of adjacent vehicles in traffic and may be readily viewed by drivers in traffic surrounding the school bus. Also, in rural areas, even where there is no additional traffic, the height of the supplemental warning apparatus and its flashing lights serve to warn drivers from afar that the bus is stopped and thus must be respected as such.

The supplemental warning apparatus may, as described herein, be operable by connecting the motor which drives the display member to the door of the school bus so that when the door is opened, the display member is shifted to its vertical warning position. Also, it is contemplated that the supplemental warning apparatus may be coupled with the usual warning sign assembly on the side of the bus whereby when the same is activated by the driver of the bus, the supplemental warning apparatus will be simultaneously activated.

Lastly, the supplemental warning apparatus may be independently operated by the driver of the bus so that it may be selectively activated depending upon surrounding traffic conditions.

Thus the supplemental warning apparatus which includes the vertically positioned display member, when in a warning condition, serves to present signals from the bus which clearly indicate its stopped condition even though the usual warning sign at the side of the bus may not be visible to adjacent traffic because of the height of the passenger vehicles adjacent the bus, which height blocks the view of the usual warning sign extending from the side of the bus.

Those skilled in the art will appreciate that the present invention encompasses many variations in the preferred embodiment described herein. For example, the invention finds utility for many types of vehicles including vans, trucks, automobiles and even boats. Also, the preferred warning indicator can include devices other than the preferred lights such as flags and signs. As a final example, the preferred operating assembly could be manually operated in the place of the preferred motor or even hydraulically operated.

Having thus described the preferred embodiment, the following is claimed as new and desired to be secured by Letters Patent:

1. In combination:
    a school bus presenting a front side, a back side, a driver's side, a side opposite the driver's side, a top and a bottom;
    a conventional warning display mounted on the driver's side of said school bus;
    a supplementary warning display mounted on the top of said school bus, said supplementary warning display comprising:
        an elongate base mounted to the top of said bus; and
        an extendable member presenting a first end connected to said base and an opposed second end, said extendable member being shiftable between a retracted position, wherein said second end is adjacent said base, and an extended position wherein said second end is shifted away from said base and is thereby viewable by drivers of vehicles in view of any of the sides of said bus, said extendable member further presenting a back side lying adjacent to said base when said extendable member is in said retracted position, a front side opposed to said back side, a left side adjacent said first end, and a right side adjacent said second end, said right side farther presenting a major planar surface oriented perpendicularly to said base when said member is in said retracted position and parallel to said base when said member is in said extended position and including a light mounted thereto, said light being visible from any of said school bus sides when said member is in said extended position.

2. The combination of claim 1, said member front side including a plurality of warning indicators mounted thereto.

3. The combination of claim 2, said plurality of warning indicators being selected from the group consisting of lights, reflectors, strobe lights, lamps, flags, signs, and combinations thereof.

4. The combination of claim 1 further comprising a motor mechanically coupled with said extendable member, said motor operable for selectively shifting said extendable member between said retracted and said extended positions.

5. The combination of claim 4 further comprising a control switch electrically connected to said motor, said control switch operable for activating said motor.

6. The combination of claim 5, said driver's side-mounted warning display including a motor operable for selectively shifting said driver's side-mounted warning display between a retracted position and an extended position, said control switch being electrically connected to said motor of said driver's side-mounted warning display.

7. The combination of claim 1, said second end being viewable from above the school bus.

8. An improved warning display for a bus presenting a front side, a back side, a driver's side, a side opposite the driver's side, a top, a bottom, and having a conventional warning display mounted on the driver's side, wherein the improvement comprises:
    a supplementary warning display mounted on the top of said school bus, said supplementary warning display further comprising:
        an elongate base mounted to the top of the bus; and
        an extendable member presenting a first end connected to said base and an opposed second end, said extendable member being shiftable between a retracted position, wherein said second end is adjacent said base, and an extended position wherein said second end is shifted away from said base and is thereby viewable by drivers of vehicles in view of any of the sides of said bus, said extendable member further presenting a back side lying adjacent to said base when said extendable member is in said retracted position, a front side opposed to said back side, a left side adjacent said first end, and a right side adjacent said second end, said right side further presenting a major planar surface oriented perpendicularly to said base when said member is in said retracted position and parallel to said base when said member is in said extended position and including a light mounted thereto, said light being visible from any of said school bus sides when said member is in said extended position.

9. The improved warning display of claim 8, said member front side including a plurality of warning indicators mounted thereto.

10. The improved warning display of claim 9, said plurality of warning indicators being selected from the group consisting of lights, reflectors, strobe lights, lamps, flags, signs, and combinations thereof.

11. The improved warning display of claim 8 further comprising a motor mechanically coupled with said extendable member, said motor operable for selectively shifting said extendable member between said retracted and said extended positions.

12. The improved warning display of claim 11 further comprising a control switch electrically connected to said motor, said control switch operable for activating said motor.

13. The improved warning display of claim 12, said driver's side-mounted warning display including a motor operable for selectively shifting said driver's side-mounted warning display between a retracted position and an extended position, said control switch being electrically connected to said motor of said driver's side-mounted warning display.

14. The improved warning display of claim 8, said second end being viewable from above the school bus.

15. A method of increasing safety for people embarking or disembarking from the school bus of claim 1 comprising the steps of:

extending said driver's side-mounted warning display; and extending said supplementary warning display to a position viewable by drivers of vehicles positioned behind, ahead, adjacent the driver's side of the bus, adjacent the side opposite the driver's side of the bus, and on cross streets near the bus, whereby such drivers are alerted that passengers are embarking or disembarking from the school bus and instructing such drivers to stop their vehicles, thereby permitting embarking or disembarking people an increased area of safety.

16. The method of claim 15 wherein said side-mounted warning display and said supplemental warning display are extended simultaneously.

17. The method of claim 15, said supplemental warning display further including a light mounted thereto, wherein the method further includes the step of illuminating said light when said supplemental warning display is extended.

\* \* \* \* \*